US008172541B2

(12) United States Patent
Cairo

(10) Patent No.: US 8,172,541 B2
(45) Date of Patent: May 8, 2012

(54) INTERNALLY-DAMPED AIRFOIL AND METHOD THEREFOR

(75) Inventor: Ronald Ralph Cairo, Greer, SC (US)

(73) Assignee: General Electric Company, Schenectady, NY (US)

( * ) Notice: Subject to any disclaimer, the term of this patent is extended or adjusted under 35 U.S.C. 154(b) by 563 days.

(21) Appl. No.: 12/394,260

(22) Filed: Feb. 27, 2009

(65) Prior Publication Data

US 2010/0221113 A1 Sep. 2, 2010

(51) Int. Cl.

| | |
|---|---|
| *B64C 11/04* | (2006.01) |
| *B64C 11/16* | (2006.01) |
| *B64C 27/46* | (2006.01) |
| *F03B 3/12* | (2006.01) |
| *F03B 7/00* | (2006.01) |
| *F04D 29/34* | (2006.01) |
| *F04D 29/38* | (2006.01) |
| *B63H 1/26* | (2006.01) |
| *B63H 7/02* | (2006.01) |
| *F01D 5/14* | (2006.01) |
| *F03D 11/02* | (2006.01) |

(52) U.S. Cl. .................................... 416/229 R; 416/500

(58) Field of Classification Search ............... 416/229 A
See application file for complete search history.

(56) References Cited

U.S. PATENT DOCUMENTS

| | | | | |
|---|---|---|---|---|
| 6,582,195 | B2 | 6/2003 | Davidson | |
| 7,070,390 | B2 * | 7/2006 | Powell | 416/224 |
| 7,118,346 | B2 * | 10/2006 | Read | 416/232 |
| 7,121,803 | B2 | 10/2006 | Gautreau et al. | |
| 7,278,830 | B2 | 10/2007 | Vetters | |
| 2003/0070321 | A1 * | 4/2003 | Davis et al. | 36/43 |

* cited by examiner

*Primary Examiner* — Michael Lebentritt
*Assistant Examiner* — Valerie N Brown
(74) *Attorney, Agent, or Firm* — Ernest G. Cusick; Gary M. Hartman; Domenica N. S. Hartman

(57) ABSTRACT

An airfoil component and method for producing the component. The component has root and airfoil portions, the latter having an airfoil tip and oppositely-disposed concave and convex surfaces that converge at leading and trailing edges of the airfoil portion. The airfoil portion has at least one stiffener between first and second walls thereof that define the concave and convex surfaces, respectively. The stiffener defines multiple internal cavities within the airfoil portion that extend in the span-wise direction of the airfoil portion. A polymeric material fills at least one of the internal cavities and is bonded to the airfoil portion only at an extremity of the internal cavity nearer the root portion, and not to the stiffener or to the first and second walls of the airfoil portion, to define an internal damping member that provides a vibratory damping effect to the airfoil portion.

20 Claims, 1 Drawing Sheet

INTERNALLY-DAMPED AIRFOIL AND METHOD THEREFOR

BACKGROUND OF THE INVENTION

The present invention generally relates to airfoils, and more particularly to relatively lightweight airfoils capable of increased efficiencies when used as compressor blades of gas turbine engines.

There are ongoing efforts to increase the work per stage of compression in gas turbine engines to reduce the overall engine system cost. Such improvements can be evaluated in part by a factor known as $AN^2$, which is the product of the area of the compressor blade inner and outer flow paths multiplied by the mechanical speed squared. Compressor blades of gas turbines are typically mechanically attached to rotor wheels/disks with a fir tree or dovetail-configured mechanical attachment, whose life is limited by the high loads that must be withstood due to the size and weight of the blades. Heavy blade airfoils require large blade attachments and create large attachment stresses, which in turn result in large disk rim loads that necessitate large disks to support those loads. Higher disk speeds necessary to increase $AN^2$ result in still higher blade loading, requiring further increases in the size and weight of the blade attachments and disks.

In view of the above, it can be appreciated that reductions in airfoil weight would be advantageous for improving engine efficiencies and reducing costs. However, weight reductions must not be made at the expense of the structural integrity of the blade. For example, during engine operation the air flowing over compressor blades will vary in terms of speed, temperature, pressure, and density, resulting in the blades being excited in a number of different modes of vibration that induce bending and torsional twisting of their airfoils. The resulting vibration-induced stresses in the blades can cause high cycle fatigue (HCF), particularly if blades are excited at their resonant frequencies. Several technologies have been investigated to address the need for damping fan and compressor airfoils. Notable examples include visco-elastic constraint layer damping systems (VE/CLDS), air-films, internal dampers, and coatings. However, these damping technologies often encounter limitations related to structural integrity, aerodynamic efficiencies, and manufacturing difficulties.

BRIEF DESCRIPTION OF THE INVENTION

The present invention provides a relatively lightweight airfoil component and method for producing the component, which is preferably capable of increasing the efficiency of, for example, a gas turbine engine.

According to a first aspect of the invention, the airfoil component includes a root portion having means for attaching the component to a support structure, and an airfoil portion extending from the root portion in a span-wise direction of the airfoil portion. The airfoil portion has an airfoil tip at a span-wise extremity thereof and oppositely-disposed concave and convex surfaces spaced apart in a thickness-wise direction thereof. The concave and convex surfaces converge at leading and trailing edges of the airfoil portion that are spaced apart in a chord-wise direction of the airfoil portion. The airfoil portion further has at least one stiffener between first and second walls thereof that define the concave and convex surfaces, respectively. The at least one stiffener defines multiple internal cavities within the airfoil portion that extend in the span-wise direction of the airfoil portion so that each of the multiple internal cavities has a first extremity relatively nearer the root portion and a second extremity relatively nearer the airfoil tip. A polymeric material fills at least one of the internal cavities and is bonded to the airfoil portion only at the first extremity of the at least one internal cavity and not to the at least one stiffener or to the first and second walls of the airfoil portion so as to define at least one internal damping member that provides a vibratory damping effect to the airfoil portion.

According to a second aspect of the invention, the method includes forming an airfoil component to have a root portion and an airfoil portion extending from the root portion in a span-wise direction of the airfoil portion, and so that the root portion has means for attaching the component to a support structure, the airfoil portion has an airfoil tip at a span-wise extremity thereof, and at least one stiffener defines multiple internal cavities within the airfoil portion that extend in the span-wise direction of the airfoil portion so that each of the multiple internal cavities has a first extremity relatively nearer the root portion and a second extremity relatively nearer the airfoil tip. At least one of the internal cavities is then filled with a polymeric material so that the polymeric material defines at least one internal damping member that is bonded to the airfoil portion only at the first extremity of the at least one internal cavity and not to the at least one stiffener. Additional steps are then performed so that the airfoil portion comprises oppositely-disposed concave and convex surfaces spaced apart in a thickness-wise direction of the airfoil portion, the concave and convex surfaces converge at leading and trailing edges of the airfoil portion that are spaced apart in a chord-wise direction of the airfoil portion, the at least one stiffener is between first and second walls of the airfoil portion that define the concave and convex surfaces, respectively, and the at least one internal damping member is not bonded to the first and second walls of the airfoil portion and provides a vibratory damping effect to the airfoil portion.

A significant advantage of this invention is the ability to reduce the average density of an airfoil component, and particularly a rotating airfoil component (such as a compressor blade) in order to reduce the attachment stresses, rim loading and disk bore stresses, without sacrificing the life of the component.

Other aspects and advantages of this invention will be better appreciated from the following detailed description.

DETAILED DESCRIPTION OF THE INVENTION

Figure 1:
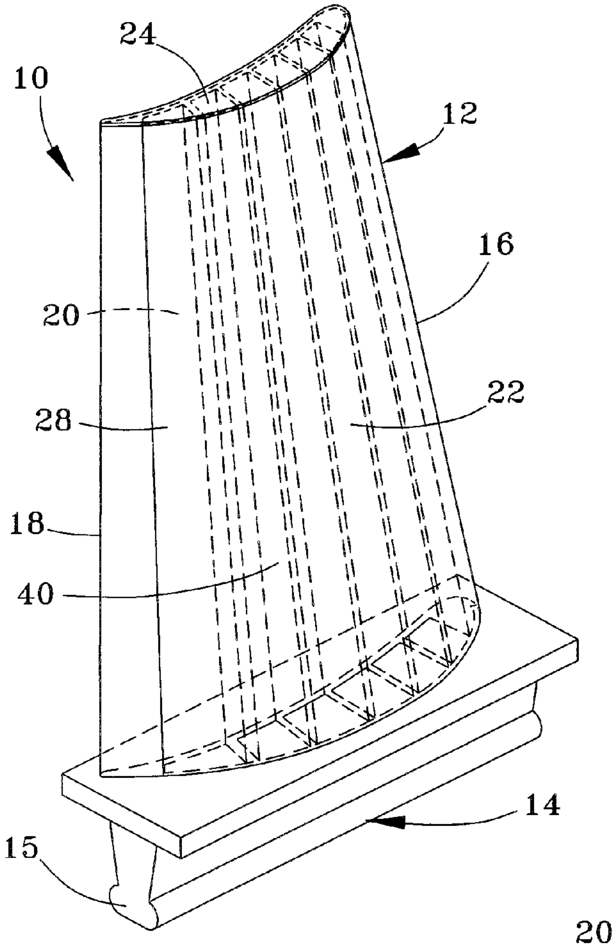
FIG. 1 is a perspective view of an airfoil component in accordance with an embodiment of this invention.
Figure 2:
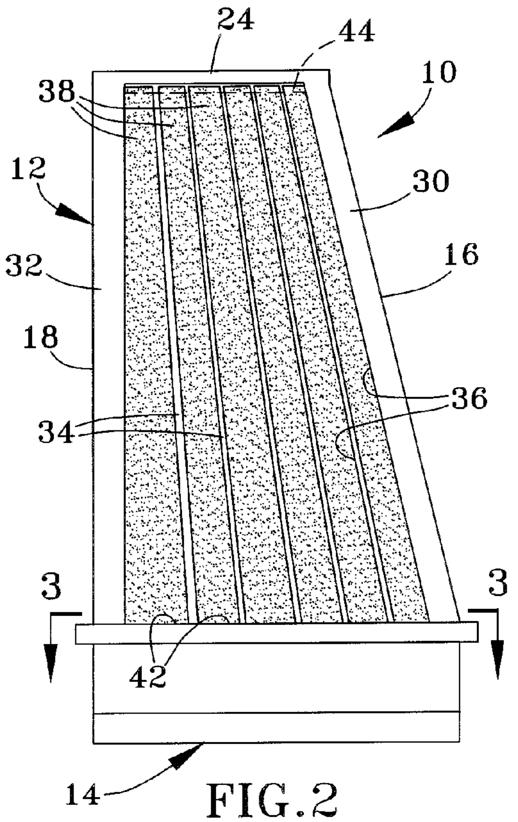
FIG. 2 represents a view of the airfoil component of FIG. 1 in which the interior of the component is exposed.
Figure 3:
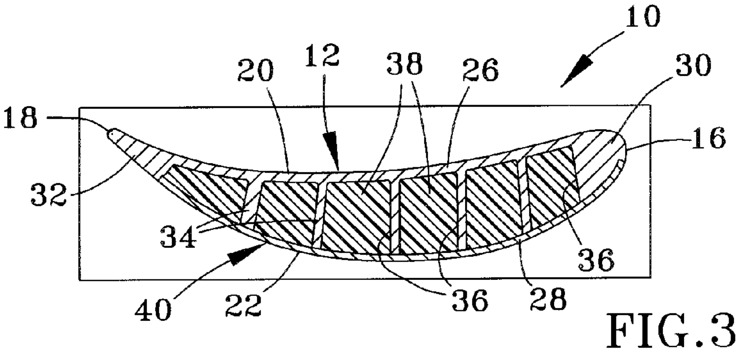
FIG. 3 is a cross-sectional view of the airfoil component of FIG. 1.
Figure 4:
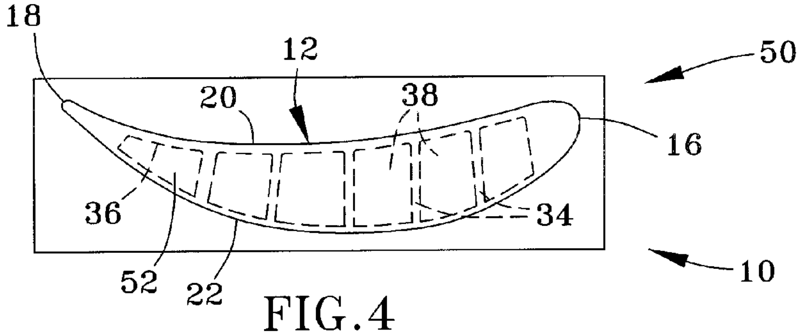
FIG. 4 is an end view of an airfoil component in accordance with a second embodiment of this invention.

FIGS. 1 through 3 schematically represent an airfoil component 10 in accordance with a first embodiment of the invention, and FIG. 4 schematically represents an airfoil component 50 in accordance with a second embodiment of the invention. It should be noted that the drawings are drawn for purposes of clarity when viewed in combination with the following description, and therefore are not necessarily to scale. Nor are the particular shapes of the components 10 and 50 intended to limit the type of airfoil component encompassed by the invention. In the drawings, identical reference numerals denote the same elements throughout the various views.

Referring to the embodiment of FIGS. 1 through 3, the component 10 can be seen to have an airfoil portion 12 and a root portion 14, with the latter having a dovetail feature 15 capable of interlocking with a complementary feature of a rotor disk (not shown) in a manner well known in the art. Consistent with industry nomenclature, the airfoil portion 12 can be described as having oppositely-disposed leading and trailing edges 16 and 18 and oppositely-disposed concave (pressure) and convex (suction) surfaces 20 and 22, which may be referred to as pressure and convex surfaces, respectively, in the context of a compressor blade. An airfoil tip 24 is defined at the span-wise outer extremities of walls 26 and 28 that define the concave and convex surfaces 20 and 22, respectively, of the airfoil portion 12. As evident from FIG. 3, the concave and convex walls 26 and 28 converge at wall sections 30 and 32 that define the leading and trailing edges 16 and 18, respectively. Also consistent with industry nomenclature, the component 10 is said to have a span direction through the airfoil and root portions 12 and 14, a chord extending between the leading and trailing edges 16 and 18, and a thickness as measured from the concave surface 20 to the convex surface 22. The airfoil and root portions 12 and 14, including the airfoil tip 24, walls 26 and 28 and wall sections 30 and 32 of the airfoil portion 12, may be formed of a variety of materials, including iron-, titanium-, and nickel-based alloys, as well as polymeric- and ceramic-based composite (for example, ceramic matrix composite (CMC)) materials.

FIG. 3 shows the entire convex wall 28 between the wall sections 30 and 32 as defined by a separate convex closure skin 40 that is joined to the integrally-stiffened concave wall 26 by a secondary joining process, and FIG. 2 represents the airfoil portion 12 with the closure skin 40 omitted to expose the interior of the airfoil portion 12. As evident from FIGS. 2 and 3, the interior of the component 10 contains multiple ribs 34, also referred to herein as stiffeners, that approximately extend in the span-wise and thickness-wise directions of the airfoil portion 12. The ribs 34 are preferably (though not necessarily) integrally formed with the concave wall 26, for example, during the initial fabrication or post-machining operations performed on the component 10. The ribs 34 define multiple troughs or cavities 36 within the airfoil portion 12 that are shown as being almost entirely filled by damping members 38. Gaps (not shown) are present between the damping members 38 and the ribs 34, walls 26 and 28, and wall sections 30 and 32, and are continuous between span-wise extremities 42 and 44 of the cavities 36 to allow for relative motion between the damping members 38 and the surrounding structures of the airfoil portion 12. The gaps can be as small as about 0.0005 inch (about 10 micrometers), with an upper limit believed to be about 0.005 inch (about 0.1 millimeter) to achieve effective damping. Each cavity 36 is represented as containing a single damping member 38, though it is foreseeable that certain cavities 36 might not contain a damping member 38. The damping members 38 are preferably formed of a material that is less dense than the material (or materials) used to form the root portion 14 and the walls 26 and 28 and wall sections 30 and 32 of the airfoil portion 12. Preferred materials for the damping members 38 include polymeric materials, particular nonlimiting examples of which are Viscoelastic Damping Polymers commercially available from 3M, though other polymers such as polypropylene, polyetheretherketone, polysulfone, etc., could also be used. The damping members 38 can be formed by injecting a polymeric damping material into the cavities 36 through the opening defined in the absence of the convex closure skin 40. In alternative embodiments where the airfoil and root portions 12 and 14 are an integral unit and the component 10 lacks a separate closure skin 40, the damping material can then be introduced through injection ports disposed in the airfoil tip 24, preferably assisted by gravity. Subsequent processing necessary to cure the injected damping material will depend on the particular material used, and is well within the capabilities of those skilled in the art.

The cavities 36 and damping members 38 effectively reduce the average density of the airfoil portion 12 and, therefore, the airfoil component 10 as a whole. In one embodiment of the invention, preferably at least five cavities 36 constituting at least 50 percent, for example, 50 to about 75 percent, of the chord-wise cross-sectional area of the airfoil portion 12 are present in order to achieve a desirable degree of weight reduction and stiffness for the component 10.

To achieve a desirable vibrational damping effect, the longitudinal ends of the damping members 38 are preferably restrained adjacent the airfoil tip 24 and adjacent the root portion 14, while the lengths of the damping members 38 therebetween are allowed to move within the gaps between the members 38 and the surrounding airfoil walls 26 and 28, wall sections 30 and 32, and ribs 34. In FIG. 2, the damping members 38 are shown supported by a land at the span-wise outer extremities 44 of the cavities 36 adjacent the airfoil tip 24, so that the span-wise outer ends of the damping members 38 are restrained when under the action of extreme centrifugal loading. The span-wise inner ends of the damping members 38 are preferably adhesively restrained, for example, as a result of the members 38 being bonded to only the extremities 42 of the cavities 36 nearest the root portion 14, and not to the airfoil tip 24, the walls 26 and 28, the wall sections 30 and 32, or the ribs 34. For example, a polymer composite release agent, such as a mold release agent commercially available from the Loctite Corporation under the name LOCTITE® FREKOTE®, can be applied to all surfaces of the cavities 36 at which gaps are desired with the damping members 38. The closure skin 40 can be similarly coated with the release agent before being joined to the remainder of the airfoil portion 12. Alternatively, injection ports (not shown) can be provided in the root portion 14 of the component 10, and the release agent sprayed through these ports and into each of the cavities 36, preferably in a gravity-enhanced direction, after which the ports can be sealed. The damping material can then be introduced through injection ports disposed in the airfoil tip 24, again preferably in a gravity-enhanced direction, allowing bonding to occur only where the root injection ports were closed. The tip injection ports can then be sealed after the damping members 38 are formed.

The thickness, chord-wise width, span-wise length, orientation, mass, and manner of attaching the damping members 38 promote the ability of the damping members 38 to provide internal damping of the airfoil portion 12. Furthermore, the number, dimensions, span-wise orientations, and masses of the ribs 34 and damping members 38 can be tailored to provide a specific frequency and strength tuning capability to the component 10. In this manner, the invention is able to take advantage of the low density and visco-elastic properties of polymeric materials to enable the damping members 38 to provide damping at critical, high-amplitude, vibratory locations within the component 10, while simultaneously allowing for reliance on the strength, wear/rub resistance, dimensional control, and overall robustness of other materials for the airfoil and root portions 12 and 14 of the component 10, to achieve an overall significant reduction in centrifugal loading generated by the component 10. The resulting reduced loading on the dovetail feature 15 of the root portion 14 significantly reduces stress-related issues conventionally associated with dovetails of compressor blades. Moreover, the reduction in centrifugal loading generated by the component 10 also reduces rim loading of the disk on which the component 10 is installed, reducing disk bore stresses and allowing for increased rotor life, increased burst margin, and/or reduced disk size and cost. The risk of catastrophic compressor failure due to blade liberation can be further reduced as a result of the ribs 34 and cavities 36 effectively retarding or stopping crack propagation should a crack form in a rib 34 or in a portion of one of the walls 26 and 28 spanning adjacent pairs of the ribs 34.

In the embodiment of FIGS. 1 through 3, the convex skin 28 is assembled to the monolithic remainder of the component 10 formed by the root portion 14 and the wall sections 30 and 32, the ribs 34, the airfoil tip 24, and the wall 26 defining the concave surface 20 of the airfoil portion 12. By attaching the skin 28 to the root portion 14 and to the airfoil tip 24, wall sections 30 and 32, and ribs 34 of the airfoil portion 12, the cavities 36 and damping members 38 are entirely enclosed within the component 10. Depending on the material used to form the airfoil portion 12, attachment can be achieved with an adhesive, such as an epoxy for low temperature service applications (for example, less than about 300° F. (about 150° C.)), or a polymide for intermediate temperature service applications (for example, less than about 600° F. (about 320° C.)), though attachment by brazing or welding is also within the scope of the invention if suitable heat shielding is provided for the damping members 38. The embodiment depicted in FIGS. 1 through 3 is generally believed to be more suitable for relatively low application temperatures of up to, for example, about 200 to about 600° F. (about 90 to about 320° C.). For higher application temperatures, for example, up to about 2200° F. (about 1200° C.), the convex wall 28 can be metallurgically joined to or formed integrally with the remainder of the component 10 and prior to forming the damping members 38. The damping members 38 are then formed by injecting a high temperature medium, such as a ceramic slurry material, into the cavities 36 through the airfoil tip 24, where the outer radial extremities of the cavities 36 are exposed. Similar to the mold release agent used with polymeric damping materials discussed above, a fugitive release agent can be used to pre-coat the interior surfaces of the cavities 36 where the gaps are required. The fugitive release agent can then be volatilized as the slurry is heated for solidification. After filling the cavities 36 to form the damping members 38, the openings in the airfoil tip 24 can be closed, such as with a separate cap 52 represented for the airfoil component 50 of FIG. 4. Alternatively, the ends of the cavities 36 can be closed with brazements or weldments (not shown). Finally, it may be desirable to provide cooling air flow through the cavities 36 and around the damping members 38, particularly if the component 10 is intended for high temperature applications and therefore formed of a superalloy, CMC material, or other material with high temperature capabilities. In addition or alternatively, the damping members 38 could be formed of a material with a higher temperature capability than conventional polymeric materials.

In view of the above, it can be appreciated that a significant advantage of this invention is the ability to reduce the average density of an airfoil component, and particularly a rotating airfoil component (such as a compressor blade) in order to reduce the attachment stresses, rim loading and disk bore stresses, without sacrificing the life of the component. The invention takes advantage of the relatively low density and visco-elastic properties of polymeric materials to provide a significant reduction in centrifugal loading and minimize vibration-induced stresses, while also allowing for the use of metal and/or composite materials for the root portion 14 and the exterior of the airfoil portion 12 (which may or may not be monolithic) to take advantage of the strength, wear/rub resistance, dimensional control, and overall robustness of these materials. The damping members 38 also enable specific frequency and strength tuning of the component 10 while remaining protected within the closed internal cavities 36, which control the position of the damping members 38 within the component 10 and enable the damping members 38 to extend into regions within the component 10 where the greatest vibratory amplitude is likely to occur, thereby maximizing the damping efficiency (low contact pressure and high damping). The combination of the stiffening ribs 34 and damping members 38 can also provide a degree of damage tolerance for the component 10, especially in rotating blade applications. For example, damage tolerance can be promoted due to the discrete boundaries afforded by the ribs 34 and their interfaces with the walls 26 and 28 of the airfoil portion 12 that define the concave and convex gas path surfaces 20 and 22 of the component 10. The ribs 34 can have the capability of arresting cracks in the gas path surfaces 20 and 22 to prevent or at least inhibit crack growth in the chord-wise direction of the airfoil portion 12.

Other significant advantages of this invention include the ability to the airfoil component 10 to be retrofitted into existing hardware, due to the wear/rub robustness capability of the root portion 14 and exterior of the airfoil portion 12, particularly if these portions 12 and 14 of the component 10 have a monolithic construction. The ability to achieve a reduction in the weight of the component 10 also reduces the overall loading of the attachment structure between the root portion 14 and the support structure, for example, the rim of a compressor rotor, which can reduce if not eliminate certain dovetail root problems in compressor applications. The resulting reduction in disk rim loading reduces disk bore stresses, which can lead to increased rotor life, increased burst margin, or/or reduced disk size and associated costs.

While the invention has been described in terms of specific embodiments, it is apparent that other forms could be adopted by one skilled in the art. For example, the physical configuration of the component 10 could differ from that shown, and materials and processes other than those noted could be used. Therefore, the scope of the invention is to be limited only by the following claims.

The invention claimed is:

1. A airfoil component comprising:

a root portion having means for attaching the component to a support structure;

an airfoil portion extending from the root portion in a span-wise direction of the airfoil portion, the airfoil portion having an airfoil tip at a span-wise extremity thereof and oppositely-disposed concave and convex surfaces spaced apart in a thickness-wise direction thereof, the concave and convex surfaces converging at leading and trailing edges of the airfoil portion that are spaced apart in a chord-wise direction of the airfoil portion, the airfoil portion having at least one stiffener between first and second walls of the airfoil portion that define the concave and convex surfaces, respectively, the at least one stiffener defining multiple internal cavities within the airfoil portion that extend in the span-wise direction of the airfoil portion so that each of the multiple internal cavities has a first extremity relatively nearer the root portion and a second extremity relatively nearer the airfoil tip; and a polymeric material defining at least a first internal damping member within at least one of the internal cavities, the first internal damping member having first and second longitudinal ends disposed and restrained at, respectively, the first and second extremities of the at least one internal cavity and having a length therebetween, the first internal damping member defining continuous gaps between the length thereof and the at least one stiffener and the first and second walls of the airfoil portion that allow relative motion of the length of the first internal damping member, the first internal damping member being supported at the second extremity of the at least one internal cavity and being bonded to the airfoil portion at the first extremity of the at least one internal cavity and not being supported by or bonded to the at least one stiffener or the first and second walls of the airfoil portion so that the first internal damping member provides a vibratory damping effect to the airfoil portion.

2. The airfoil component according to claim 1, wherein the polymeric material is within each of the multiple internal cavities so as to define an internal damping member within each of the multiple internal cavities.

3. The airfoil component according to claim 1, further comprising a land at the second extremity of the at least one internal cavity that supports but is not bonded to the second longitudinal end of the first internal damping member and restrains the second longitudinal end under centrifugal loading.

4. The airfoil component according to claim 1, wherein at least one of the first and second walls is a discrete article that is bonded to the root portion.

5. The airfoil component according to claim 1, wherein the second wall is a discrete article that is bonded to the root portion and to the first wall.

6. The airfoil component according to claim 5, wherein the second wall is bonded with an adhesive to the root portion and to the first wall.

7. The airfoil component according to claim 5, wherein the second wall is metallurgically bonded to the root portion and to the first wall.

8. The airfoil component according to claim 1, wherein the first and second walls merge at the airfoil tip to close the multiple internal cavities at the second extremities thereof.

9. The airfoil component according to claim 1, further comprising means discrete from the first and second walls for closing the multiple internal cavities at the second extremities thereof.

10. The airfoil component according to claim 1, wherein the airfoil component is a rotating blade, the support structure is a rotor of a gas turbine engine, and the attaching means is configured to attached the blade to the rotor.

11. A method of manufacturing an airfoil component, the method comprising:

forming the airfoil component to have a root portion and an airfoil portion extending from the root portion in a span-wise direction of the airfoil portion, the root portion having means for attaching the component to a support structure, the airfoil portion having an airfoil tip at a span-wise extremity thereof and at least one stiffener defining multiple internal cavities within the airfoil portion that extend in the span-wise direction of the airfoil portion so that each of the multiple internal cavities has a first extremity relatively nearer the root portion and a second extremity relatively nearer the airfoil tip;

filling at least one of the internal cavities with a polymeric material so that the polymeric material defines at least a first internal damping member having first and second longitudinal ends disposed at, respectively, the first and second extremities of the at least one internal cavity and having a length therebetween, the first longitudinal end of the first internal damping member being bonded to the airfoil portion at the first extremity of the at least one internal cavity and the length of the first internal damping member not being bonded to the at least one stiffener; and then performing additional steps so that the airfoil portion comprises oppositely-disposed concave and convex surfaces spaced apart in a thickness-wise direction of the airfoil portion, the concave and convex surfaces converge at leading and trailing edges of the airfoil portion that are spaced apart in a chord-wise direction of the airfoil portion, the at least one stiffener is between first and second walls of the airfoil portion that define the concave and convex surfaces, respectively, the first internal damping member defines continuous gaps between the length thereof and the at least one stiffener and the first and second walls of the airfoil portion that allow relative motion of the length of the first internal damping member, the first internal damping member is supported and restrained at the second extremity of the at least one internal cavity, and the first internal damping member is not supported by or bonded to the at least one stiffener or to the first and second walls of the airfoil portion and provides a vibratory damping effect to the airfoil portion.

12. The method according to claim 11, wherein the filling steps is performed so that the polymeric material is within each of the multiple internal cavities so as to define an internal damping member within each of the multiple internal cavities.

13. The method according to claim 11, further comprising:

supporting the second longitudinal end of the first internal damping member with a land at the second extremity of the at least one internal cavity without bonding the second longitudinal end to the land; and restraining the second longitudinal end with the land under centrifugal loading.

14. The method according to claim 11, wherein the continuous gaps surrounding the first internal damping member are formed by depositing a release agent on the at least one stiffener and the first and second walls of the airfoil portion prior to the filling step.

15. The method according to claim 11, wherein the at least one internal cavity is filled with the polymeric material through one of the first and second extremities thereof.

16. The method according to claim 11, wherein at least one of the first and second walls is separately formed as a discrete article that is bonded to the root portion during the additional steps of the method.

17. The method according to claim 11, wherein the first wall is integrally formed with the root portion during the forming step, and the second wall is separately formed as a discrete article that is bonded to the root portion and to the first wall during the additional steps of the method.

18. The method according to claim 17, wherein as a result of the additional steps of the method the first and second walls merge at the airfoil tip to close the multiple internal cavities at the second extremities thereof.

19. The method according to claim 11, wherein the first and second walls are integrally formed with the root portion during the forming step, the multiple internal cavities are open at the airfoil tip following the filling step, and the method further comprises closing the multiple internal cavities at the second extremities thereof.

20. The method according to claim 11, wherein the airfoil component is a rotating blade, the support structure is a rotor of a gas turbine engine, and the method further comprises attaching the blade to the rotor with the attaching means of the root portion.

* * * * *